June 2, 1953 — L. E. DE NEERGAARD — 2,640,938
FREQUENCY GENERATOR FOR MACHINE CONTROL SYSTEMS
Original Filed April 10, 1947
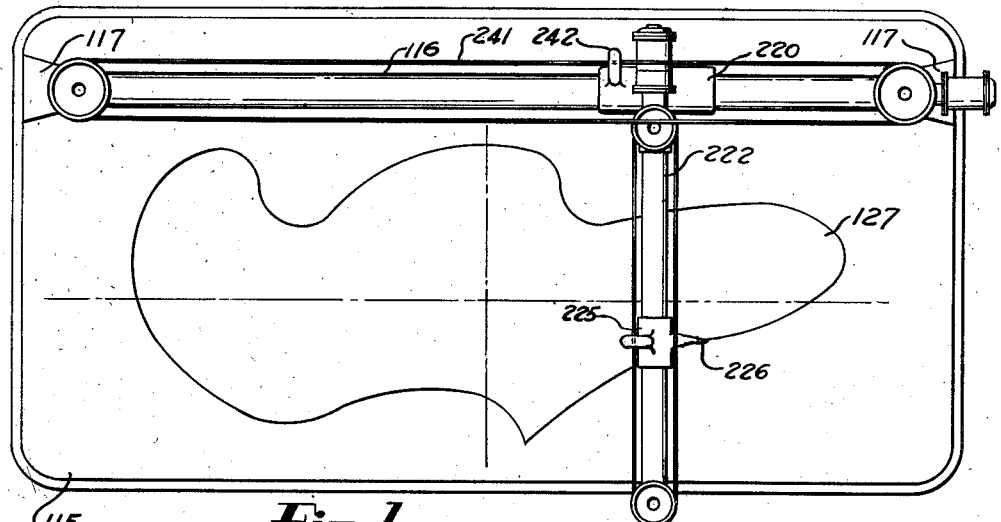
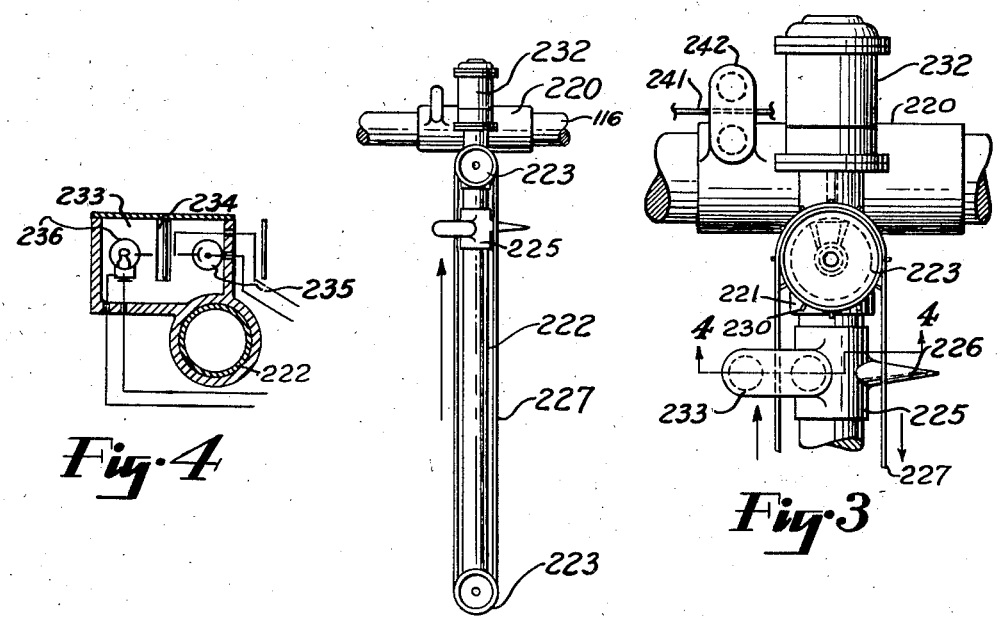
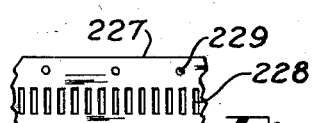
INVENTOR.
LEIF ERIC DE NEERGAARD
BY Albert R. Golrick
ATTORNEY Patented June 2, 1953

2,640,938

UNITED STATES PATENT OFFICE 2,640,938

FREQUENCY GENERATOR FOR MACHINE CONTROL SYSTEMS

Leif E. de Neergaard, Buffalo, N. Y., assignor to Actrol, Inc., Tuckahoe, N. Y., a corporation of Delaware Application April 10, 1947, Serial No. 740,688, now Patent No. 2,552,622, dated May 15, 1951, which is a division of application Serial No. 460,955, October 6, 1942, now Patent No. 2,423,440, dated July 8, 1947. Divided and this application April 27, 1951, Serial No. 227,857

4 Claims. (Cl. 250—219)

The present invention relates to apparatus for generating pulsating currents, and it is particularly adaptable for generating such currents for use in the practice of my invention disclosed and claimed in my United States Patent No. 2,423,440. This application is a division of Patent No. 2,552,-622, a division of the said Patent No. 2,423,440.

An object of the invention is to provide a pulsating current generator which can be moved along an arm for causing a stylus associated with the generator to follow the contour of a pattern over which the arm extends, the generator being slidable along the arm and being capable of causing an increase or decrease in the frequency of the pulsations in accordance with the direction and rate of movement of the generator along the arm.

Another object of the invention is to provide a generator of the type referred to in which a current is generated having a substantially fixed or a base frequency when the generator is stationary relative to the arm and which frequency varies above and below in accordance with the rate and direction of movement of the generator along the arm.

Other objects and advantages of the invention will be apparent from the following description of preferred forms of the invention, reference being made to the accompanying drawings wherein:

Fig. 1 is a plan view of a device referred to as a translator, by which the movements of a stylus about the outline of a pattern can be translated into a plurality of electrical pulsating currents;

Fig. 2 is a fragmentary plan view of one arm of the translator;

Fig. 3 is a view of certain parts of the device shown in Fig. 2 but on a larger scale;

Fig. 4 is a view taken substantially on line 4—4 of Fig. 3; and

Fig. 5 is a fragmentary view of an endless tape used in the device shown in Figs. 2 through 4.

In the U. S. Patent 2,423,440 mentioned hereinbefore, I have disclosed and claimed a method by which a machine tool or the like can be operated from a recording of pulsating electric currents to reproduce movements in the tool, which movements were formerly made by a stylus following a pattern or template. In recording the currents, the stylus is operatively connected with generators and is arranged to move relative to two or more coordinate axes of a coordinate system. The generators are each associated with a respective coordinate of the coordinate system, and they are each adapted to generate a current having a relatively fixed, or base frequency while the stylus is stationary relative to the coordinate axes with which the respective generators are associated, and to increase or decrease the frequencies of the current or signal generated thereby in accordance with the rate and direction of movement of the stylus relative to the respective coordinates. The recorded frequencies, including a current having only the base frequency, are reproduced simultaneously and the tool moved along coordinates of a similar coordinate system in accordance with the variation in the recorded frequencies from the recorded base frequency. The present invention is directed to the generators for generating these pulsating currents.

Referring now to Fig. 1, there is shown a translator consisting of a base 115 having a flat surface upon which a template or pattern 127 may be placed so that a stylus can be moved about the outline of the pattern. Means, not shown, may be provided for securing the pattern to the base.

A rod-like fixed arm or support member 116 extends lengthwise of the base and adjacent one edge thereof, and the ends of member 116 are supported slightly above the base by two brackets 117.

A bracket 220, slidable on member 116, is provided with an extension 221 to which an arm 222 is attached, the arm extending at 90° from the support rod 116. The fixed arm or support 116 and movable arm 222 lie in a plane parallel to the surface of the base 115. A bracket or carriage 225 similarly is mounted on arm 222. A stylus 226 is formed integral with the bracket 225 and it projects downwardly to a point adjacent the surface of base 115 so that it may closely follow the outline of a template on the surface.

The support 116 and arm 222 correspond to the cordinates of a coordinate system and it will be apparent that the stylus 226 can be moved to any point over a substantial area of the base 115 by sliding bracket 220 along the support 116 and by moving the brackets 225 along the arm 222. By recording simultaneously, the movements of the brackets 220 and 225 along their respective supports and reproducing the movements of the brackets by corresponding tool controlling elements, the movements of the stylus can be reproduced in the tool, as set forth in Patent 2,423,440 mentioned hereinbefore.

In order to record the movements of the brackets 220 and 225 I have provided a novel generating device, one of which is carried by each of the brackets and its associated support arm. The generating devices on each bracket and support arm are similar, and for the purposes of illustration, I will refer to the generating device on bracket 225. Reels or pulleys 223 are mounted at opopsite ends of the arm and an endless tape 227 is mounted on the pulleys. The tape 227 is formed of an opaque material and is provided with a series of evenly spaced, uniformly wide slots 228 therein, as may be seen in Fig. 5. Preferably, the tape is punctured periodically at 229 for engagement with drive teeth 230 formed on the pulleys 223. One of the pulleys 223, on bracket 220, is driven at a constant rate by a synchronous motor 232 through suitable driving gears.

The bracket 225 is provided with a housing 233 having slots 234 in opposite side walls so that the tape 227 may pass through the housing. In one side of the housing, as may be seen in Fig. 4, there is provided a photo-electric cell shown diagrammatically at 235 and on the opposite side of the tape there is provided an electric light bulb 236 which is arranged to direct a beam of light onto the photo-electric element through the slots 228. The light beam is substantially the same width as the material between the slots 228 so that as the tape passes between the bulb and cell, the light beam will be interrupted completely for an instant between the presentation of each slot. This interrupted light beam causes a pulsating current or signal output to be produced in the circuit of the light sensitive cell 235. This circuit may be connected with a recording system similar to that described in Patent 2,423,440 for recording the pulsations. It will be apparent that by moving the bracket 225 along the arm 222 the pulsations generated by the photo-electric cell 235 will be increased and decreased according to the rate and direction of movement. The base frequency of the generated current will be a function of the speed of the tape and the number of slots in the tape.

It will be understood that a tape 241 similar to tape 227 can be provided along support 116 and a photo-electric generator 242 similar to that described can be mounted on bracket 220 so that the movements of the bracket 220 can be reflected in a pulsating current generated by the photo-electric cell. For three dimensional recordings the stylus can be arranged to move vertically longitudinally so that as the stylus rises and lowers over the contour of a template it will cause variations in the frequency of the current generated in the manner described with reference to the generators on brackets 220 and 225.

Thus, by my invention, I have provided generators that may be readily mounted for movement along members forming coordinates of a coordinate system. Although the generators are formed by relatively few parts, they provide a pulsating current or signal having a fixed or base frequency when the generator is stationary relative to its associated coordinate, but which accurately increases or decreases the frequency according to the direction and rate of movement along its ordinate.

Although I have described several preferred forms of the invention, it is to be understood that other forms might be adopted, all falling within the scope of the claims which follow.

I claim:

1. A frequency generator comprising an arm, a source of light flux and a light flux responsive element in fixed relation to each other and translatable along said arm, said element being responsive to variations in light flux incident thereon by variations in an electrical characteristic of the element, a member extending linearly parallel to said arm and subject to said light flux, and means for moving said member with respect to said arm, said member having periodically disposed along its length regions of diverse transmissibility for said light flux, the shape and motion of said member being adapted to vary periodically the light flux reaching said element at any given position of the element along the arm, thereby to produce a constant frequency of change in the said electrical characteristic of the element while said light source and element are stationary on said arm and variations from said frequency corresponding to motion imparted to said source and element along said arm.

2. A frequency generator comprising an arm, a source of light flux and a light flux responsive element in fixed relation to each other and translatable along said arm, said element being responsive to variations in light flux incident thereon by variations in an electrical characteristic of the element, an endless tape having a portion thereof extending linearly parallel to said arm and passing between said light source and said light responsive element, and means for moving the said tape at a constant rate with respect to said arm, said tape having periodically disposed along its length regions of diverse transmissibility for said light flux, thereby to produce a constant frequency of change in the said electrical characteristic of the element while said light source and element are stationary on said arm and variations from said frequency corresponding to motion imparted to said source and element along said arm.

3. A frequency generator comprising an arm, a source of light and a light responsive element in fixed relation to each other, said element being responsive to variations of light flux incident thereon by variations in an electrical characteristic of the element, a housing slideably mounted for translation along said arm enclosing said light source and said light responsive element and mounting the same in said fixed relation to each other, an endless tape having a portion thereof extending linearly parallel to said arm and passing through said housing between said light source and said light responsive element, and means for moving said tape at a constant rate with respect to said arm, said tape having opaque and light transmitting portions disposed periodically along its length, thereby to produce a constant frequency of change in the said electrical characteristic of the element while said light source and element are stationary on said arm and variations from said frequency corresponding to motion imparted to said source and element along said arm.

4. A frequency generator comprising an arm, a source of light and a light responsive element in fixed relation to each other, said element being responsive to light flux incident thereon by production of an electric current, a housing slideably mounted for translation along said arm enclosing said light source and said light responsive element and mounting the same in said fixed relation to each other, an endless tape having a portion thereof extending linearly parallel to said arm and passing through said housing between said light source and said light responsive element, and means for moving said tape at a constant rate with respect to said arm, said tape being opaque and having identical transverse light slits disposed periodically along its length, whereby a pulsing current is produced by said light responsive element having a constant frequency when said light source and element are stationary relative to said arm, but having a frequency varying from said constant frequency correspondingly to the rate and direction of translation of said light source and element along said arm.

LEIF E. DE NEERGAARD.

References Cited in the file of this patent

UNITED STATES PATENTS

| Number | Name | Date |
|---|---|---|
| 2,111,013 | Vedder | Mar. 15, 1938 |
| 2,137,024 | Moore et al. | Nov. 15, 1938 |
| 2,176,828 | Walker | Oct. 17, 1939 |
| 2,246,496 | Asbury | June 24, 1941 |